(12) United States Patent
Suddaby

(10) Patent No.: US 11,959,452 B1
(45) Date of Patent: Apr. 16, 2024

(54) WAVE ENERGY CAPTURE, STORAGE, AND CONVERSION DEVICE

(71) Applicant: Loubert S. Suddaby, Orchard Park, NY (US)

(72) Inventor: Loubert S. Suddaby, Orchard Park, NY (US)

(*) Notice: Subject to any disclaimer, the term of this patent is extended or adjusted under 35 U.S.C. 154(b) by 0 days.

(21) Appl. No.: 18/058,782

(22) Filed: Nov. 25, 2022

Related U.S. Application Data

(63) Continuation-in-part of application No. 18/051,115, filed on Oct. 31, 2022.

(51) Int. Cl.
F03B 13/14 (2006.01)

(52) U.S. Cl.
CPC ...... F03B 13/147 (2013.01); *F05B 2240/243* (2013.01); *F05B 2260/422* (2020.08); *F05B 2260/60* (2013.01)

(58) Field of Classification Search
CPC .................. F03B 13/147; F05B 2240/243
See application file for complete search history.

(56) References Cited

U.S. PATENT DOCUMENTS

| | | | |
|---|---|---|---|
| 123,448 A * | 2/1872 | Brooks | F03B 17/066 416/8 |
| 1,371,836 A | 3/1921 | Antz | |
| 2,494,165 A * | 1/1950 | Diebold | B65G 47/00 198/531 |
| 6,083,382 A | 7/2000 | Bird | |
| 6,220,425 B1 * | 4/2001 | Knapp | B65G 17/126 198/709 |
| 7,152,556 B2 | 12/2006 | Goltsman | |
| 9,279,407 B2 * | 3/2016 | Sinclaire | E02B 9/08 |
| 9,309,860 B2 * | 4/2016 | Hon | F03B 13/16 |
| 9,322,278 B2 | 4/2016 | Hindle et al. | |
| 9,759,180 B2 | 9/2017 | Russo | |
| 10,028,444 B2 * | 7/2018 | McCully | A01F 12/46 |
| 11,421,645 B1 | 8/2022 | Suddaby | |
| 11,459,997 B2 * | 10/2022 | Parsa | B63B 22/04 |
| 2002/0078687 A1 | 6/2002 | Donnelly | |
| 2010/0266406 A1 | 10/2010 | Eielsen | |
| 2012/0167563 A1 * | 7/2012 | Cherepashenets | F03B 13/1855 60/504 |
| 2013/0008158 A1 * | 1/2013 | Hon | F03B 13/24 60/506 |
| 2013/0134715 A1 * | 5/2013 | Sinclaire | F03B 13/10 290/54 |
| 2013/0302174 A1 * | 11/2013 | Hindle | F01D 5/141 416/223 R |
| 2014/0110494 A1 * | 4/2014 | Mills | B05B 5/025 239/3 |
| 2014/0265337 A1 | 9/2014 | Harding et al. | |
| 2016/0368006 A9 * | 12/2016 | Mills | B05B 5/0531 |
| 2021/0301777 A1 * | 9/2021 | Parsa | F03B 13/20 |

FOREIGN PATENT DOCUMENTS

| | | | |
|---|---|---|---|
| EP | 3892848 A1 * | 10/2021 | ............. F03B 17/06 |
| KR | 102271940 B1 * | 7/2021 | ............. F03B 17/06 |
| WO | WO-2010082129 A1 * | 7/2010 | ............. F03B 15/18 |
| WO | WO-2023025678 A1 * | 3/2023 | ............. F03B 13/18 |

* cited by examiner

*Primary Examiner* — Pedro J Cuevas

(74) *Attorney, Agent, or Firm* — Harter Secrest & Emery LLP; Michael Nicholas Vranjes

(57) ABSTRACT

A wave energy capture, storage, and conversion assembly, comprising at least one pump assembly, and a point absorber operatively arranged to displace the at least one pump assembly in a first circumferential direction.

20 Claims, 9 Drawing Sheets

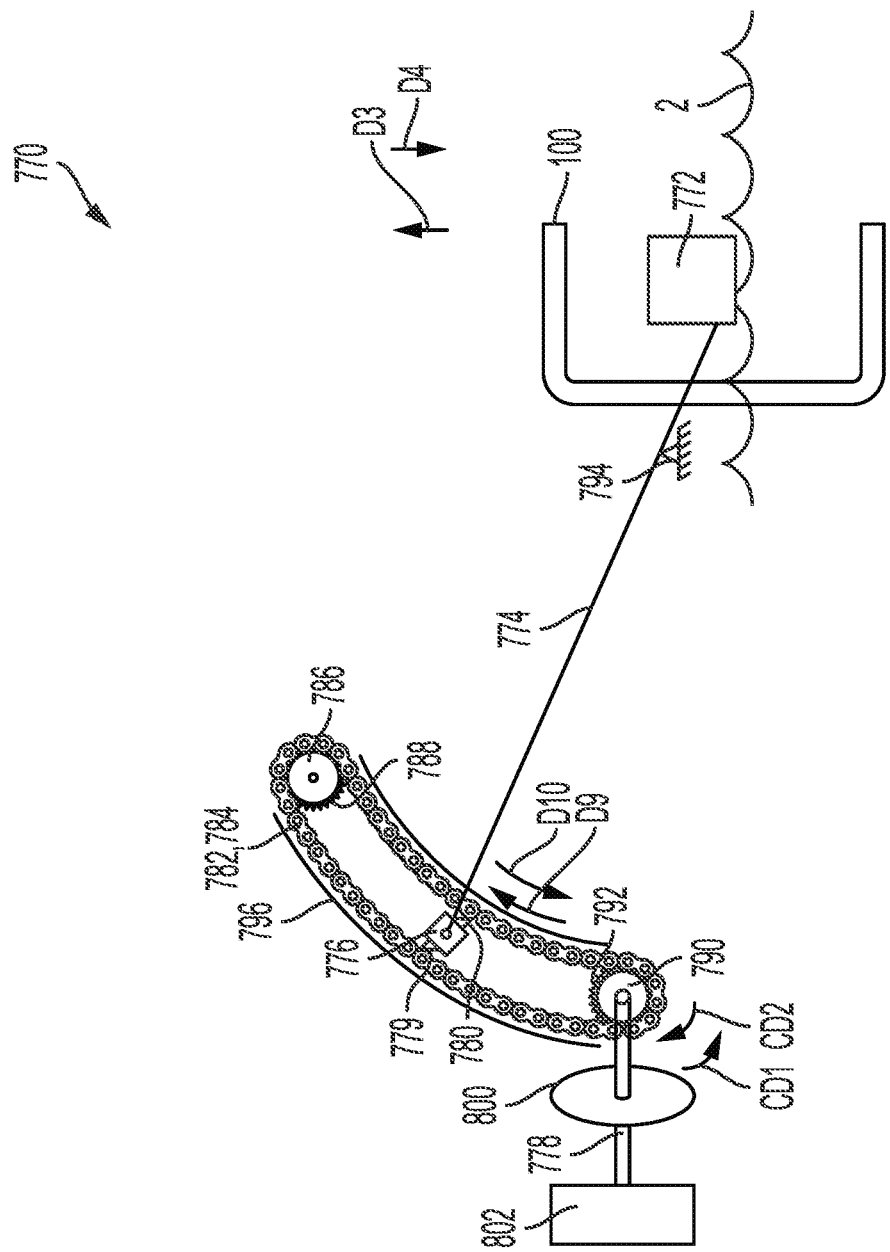

WAVE ENERGY CAPTURE, STORAGE, AND CONVERSION DEVICE

CROSS-REFERENCE TO RELATED APPLICATIONS

This application is filed under 35 U.S.C. § 120 as a continuation-in-part of U.S. patent application Ser. No. 18/051,115, filed on Oct. 31, 2022, which reference is hereby incorporated by reference in its entirety.

FIELD

The present disclosure relates to wave energy capture devices, and more particularly, to shore-based devices including a point absorber and helical water screw to convert wave energy into electricity.

BACKGROUND

The ocean is undoubtedly the largest solar panel on the planet covering 70% of the earth's surface. Additionally, wave energy contains one of the densest forms of natural energy available on earth. The theoretical annual energy production of waves off the costal United States is estimated to be as much as 2.64 trillion kilowatt hours.

While various eyesores have been proposed and currently operate to capture green noncarbon based energy, they still destroy wildlife in droves and occupy large swaths of arable land while purporting to be ecologically friendly. The destruction of large surface areas to extract minerals to construct solar electric batteries and the vast amounts of hydrocarbons burned to manufacture solar panels, and wind turbines that will populate innumerable land masses for generations speaks to the flawed logic of current green energy endeavors.

It would seem, therefore, prudent to utilize the vast amounts of energy stored in ocean waves to economically, efficiently, and efficaciously convert natural energy contained in the ocean into electricity in an easy, reliable, and environmentally friendly manner.

Thus, there is a pressing need for ecofriendly energy capture mechanisms that can simultaneously provide the dream of abundant clean energy all while preventing the various blights that current mechanisms employ.

SUMMARY

According to aspects illustrated herein, there is provided a wave energy capture, storage, and conversion assembly, comprising a first screw pump assembly, including a screw comprising a first end and a second end, and a tube at least partially encircling the screw, the tube comprising a third end and a fourth end, and a first point absorber operatively arranged to displace the screw in a first circumferential direction.

In an exemplary embodiment, the screw is rotatably connected to the tube. In an exemplary embodiment, the screw is non-rotatably connected to the tube and the first point absorber is arranged to displace the screw and the tube in the first circumferential direction. In an exemplary embodiment, as the first point absorber displaces the screw in the first circumferential direction, fluid is displaced in the tube from the third end to the fourth end. In an exemplary embodiment, the assembly further comprises a cistern, wherein the fluid flows from the fourth end to the cistern. In an exemplary embodiment, the assembly further comprises a turbine connected to the cistern. In an exemplary embodiment, the assembly further comprises a second screw pump assembly and a second point absorber connected to the second screw pump assembly. In an exemplary embodiment, the first screw pump is operatively arranged to displace fluid from a first body of water to a first cistern, and the second screw pump is operatively arranged to displace fluid from the first cistern to a second cistern.

In an exemplary embodiment, the point absorber comprises a float, and a wheel connected to the float, wherein displacement of the float in a first direction and a second direction displaces the wheel in the first circumferential direction. In an exemplary embodiment, the wheel is non-rotatably connected to the screw. In an exemplary embodiment, the point absorber further comprises a reciprocating element pivotably connected to the float, and a line engaged with the reciprocating element and the wheel. In an exemplary embodiment, the reciprocating element comprises at least one pawl operatively arranged to engage the line as the reciprocating element is displaced in the first direction, and disengage the line as the reciprocating element is displaced in the second direction, opposite the first direction. In an exemplary embodiment, the reciprocating element comprises a first pawl operatively arranged to engage the line as the reciprocating element is displaced in the first direction, and disengage the line as the reciprocating element is displaced in the second direction, opposite the first direction, and a second pawl operatively arranged to disengage the line as the reciprocating element is displaced in the first direction, and engage the line as the reciprocating element is displaced in the second direction. In an exemplary embodiment, the point absorber further comprises an arm pivotably connected to the float, the arm including a first portion operatively arranged to engage the wheel as the arm is displaced in the first direction, and disengage the wheel as the arm is displaced in the second direction, opposite the first direction, and a second portion operatively arranged to disengage the wheel as the arm is displaced in the first direction, and engage the wheel as the arm is displaced in the second direction. In an exemplary embodiment, the arm comprises a cam portion pivotably connected to the float.

According to aspects illustrated herein, there is provided a wave energy capture, storage, and conversion assembly, comprising at least one screw pump assembly, each screw pump assembly of the at least one screw pump assembly including a screw comprising a first end and a second end, and a tube at least partially encircling the screw, the tube comprising a third end and a fourth end, and a point absorber operatively arranged to displace the screw in a first circumferential direction such that fluid is displaced in the tube from the third end to the fourth end.

In an exemplary embodiment, the at least one screw pump assembly comprises a first screw pump assembly and a second screw pump assembly arranged in series. In an exemplary embodiment, the point absorber comprises a sprocket non-rotatably connected to the screw, and a float connected to the sprocket, wherein displacement of the float in a first direction or a second direction displaces the screw in the first circumferential direction. In an exemplary embodiment, the point absorber further comprises a reciprocating element pivotably connected to the float, and a chain engaged with the reciprocating element and the sprocket. In an exemplary embodiment, the point absorber further comprises an arm pivotably connected to the float and engaged with the sprocket, the arm including a first portion arranged to displace the sprocket only in the first circumferential direction, and a second portion, spaced apart from the first portion, operatively arranged to displace the sprocket only in the first circumferential direction.

According to aspects illustrated herein, there is provided a wave energy capture, storage, and conversion assembly, comprising at least one pump assembly, and a point absorber operatively arranged to displace the at least one pump assembly in a first circumferential direction such that the at least one pump assembly displaces fluid from a first altitude to a second altitude, the second altitude being greater than the first altitude.

According to aspects illustrated herein, there is provided a wave energy capture, storage, and conversion assembly, comprising at least one pump assembly, and a point absorber operatively arranged to displace the at least one pump assembly in a first circumferential direction.

In an exemplary embodiment, when the at least one pump assembly is displaced in the first circumferential direction, the at least one pump assembly displaces fluid from a first altitude to a second altitude, the second attitude being greater than the first altitude. In an exemplary embodiment, the at least one pump assembly comprises a screw pump assembly, including a screw comprising a first end and a second end, and a tube at least partially encircling the screw. In an exemplary embodiment, the at least one point absorber is operatively arranged to displace the screw in the first circumferential direction to displace fluid. In an exemplary embodiment, the at least one pump assembly comprises a first screw pump assembly, and a second screw pump assembly, the first screw pump assembly and second screw pump assembly arranged in series. In an exemplary embodiment, the first screw pump assembly is operatively arranged to displace fluid from a first body of water to a first cistern, and the second screw pump assembly is operatively arranged to displace fluid from the first cistern to a second cistern.

In an exemplary embodiment, the assembly further comprises a cistern, wherein the at least one pump assembly displaces water from a first body of water to the cistern. In an exemplary embodiment, the assembly further comprises a turbine connected to the cistern. In an exemplary embodiment, the at least one pump assembly comprises a wheel pump assembly, including a wheel, and a plurality of buckets pivotably connected to the wheel. In an exemplary embodiment, the at least one point absorber is operatively arranged to displace the wheel in the first circumferential direction to displace fluid. In an exemplary embodiment, the at least one pump assembly comprises a pump assembly, including a line, and a plurality of buckets pivotably connected to the line. In an exemplary embodiment, the at least one point absorber is operatively arranged to displace the line in the first circumferential direction to displace fluid.

In an exemplary embodiment, the point absorber comprises a float, and a wheel connected to the float, wherein displacement of the float in a first direction and a second direction displaces the wheel in the first circumferential direction. In an exemplary embodiment, the point absorber further comprises a reciprocating element pivotably connected to the float, and a line engaged with the reciprocating element and the wheel. In an exemplary embodiment, the reciprocating element comprises at least one pawl operatively arranged to engage the line as the reciprocating element is displaced in the first direction, and disengage the line as the reciprocating element is displaced in the second direction, opposite the first direction. In an exemplary embodiment, the reciprocating element comprises a first pawl operatively arranged to engage the line as the reciprocating element is displaced in the first direction, and disengage the line as the reciprocating element is displaced in the second direction, opposite the first direction, and a second pawl operatively arranged to disengage the line as the reciprocating element is displaced in the first direction, and engage the line as the reciprocating element is displaced in the second direction. In an exemplary embodiment, the point absorber further comprises an arm pivotably connected to the float, the arm including a first portion operatively arranged to engage the wheel as the arm is displaced in the first direction, and disengage the wheel as the arm is displaced in the second direction, opposite the first direction; and a second portion operatively arranged to disengage the wheel as the arm is displaced in the first direction, and engage the wheel as the arm is displaced in the second direction. In an exemplary embodiment, the arm comprises a cam portion pivotably connected to the float. In an exemplary embodiment, the point absorber comprises a wheel non-rotatably connected to the at least one pump assembly, and a plurality of paddles radially arranged on the wheel.

According to aspects illustrated herein, there is provided a wave energy capture, storage, and conversion assembly, comprising a point absorber, including a float, and a first wheel connected to the float, wherein displacement of the float in a first direction and a second direction displaces the first wheel in a first circumferential direction, and at least one pump assembly non-rotatably connected to the first wheel.

In an exemplary embodiment, when the at least one pump assembly is displaced in the first circumferential direction, the at least one pump assembly displaces fluid from a first altitude to a second altitude, the second attitude being greater than the first altitude. In an exemplary embodiment, the at least one pump assembly comprises a screw pump assembly, including a screw non-rotatably connected to the first wheel, and a tube at least partially encircling the screw. In an exemplary embodiment, the at least one pump assembly comprises a wheel pump assembly, including a second wheel non-rotatably connected to the first wheel, and a plurality of buckets pivotably connected to the second wheel. In an exemplary embodiment, the at least one pump assembly comprises a pump assembly, including a second wheel non-rotatably connected to the first wheel, a third wheel, a line non-rotatably connected to the second wheel and the third wheel, and a plurality of buckets pivotably connected to the line.

According to aspects illustrated herein, there is provided a wave energy capture device comprising a point absorber, which is a mechanism that converts the motion or movement of water into rotary motion, and an arrangement of one or more helical water screws to elevate water and thereby convert kinetic wave energy into stored potential energy which then can be released to drive hydroelectric turbines and produce grid ready electrical energy.

According to aspects illustrated herein, there is provided a wave energy capture device, and more particularly to shore based point actuator mechanisms that can convert the up and down kinetic energy stored in waves into rotatory kinetic energy that can then rotate helical screw pumps, such that sea water can be pumped to significant heights to be stored as potential energy and then converted to electrical energy via hydroelectric turbines as it is returned through a conduit to the sea.

According to aspects illustrated herein, there is provided a wave energy capture device comprising a point actuator to mechanically convert the sinusoidal motion of waves into a simple up and down motion, a means of converting this oscillatory motion into rotatory motion, and a means of storing the rotational energy as potential energy that can be later released to drive a hydroelectric turbine all while returning the exploited water to the sea as pure as when it was captured.

To achieve these ends, a point actuator including a float attached to a fulcrum may be used to convert sinusoidal oscillatory wave motion into linear up and down (or to and fro) motion via a linkage mechanism that mitigates the extremes of oscillatory motion such that damage to the conversion mechanism does not occur.

Conversion of the linear motion into rotatory motion can then be accomplished through various mechanisms including, but not limited to, piston crank shaft mechanisms, nodding donkey pumps, scotch yokes, one way rachet devices, free wheel pawl mechanisms, pawl lever mechanisms, and the like.

In an exemplary embodiment, the wave energy capture device comprises a pawl lever mechanism since it can capture both the up and down stroke of oscillating motion, with both the up and down stroke resulting in a continued unidirectional torque force to the drive shaft. In an exemplary embodiment, the wave energy capture device comprises a piston and/or crankshaft design. It should be appreciated that piston and crankshaft designs generally require a completed oscillation to result in the rotation of a shaft, whereas a pawl lever mechanism can capture major oscillations as well as minor or incomplete oscillations, all while ensuring the continued unidirectional rotation of the drive shaft.

The drive shaft is interrupted by a gear mechanism to allow finer control of the final rotational speed since the input of wave energy is expected to be variable. Various gear and clutch can be utilized to provide optimal rotation speeds to the drive shaft.

In an exemplary embodiment, the final output of the drive shaft is used to turn a helical water screw, for example an Archimedes screw, the proximal segment of which is immersed in sea water so that a continuous supply of water is available. In an exemplary embodiment, the helical water screw is encased in a tube and rotates within the tube. In an exemplary embodiment, the helical water screw is fixed to the tube so that the tube and screw can turn in unison (i.e., the helical water screw and the tube are non-rotatably connected). The first helical screw (or set of screws) acts as a positive displacement pump and as it turns, elevates water to a new level.

At the new level, a water cistern or chamber receives the water and a second screw (or set of screws) also operated by wave energy, elevates the water to another chamber and so forth until the desired height of elevation is reached. The potential energy stored is determined by height and volume of the displaced water or fluid. The final cistern has an exit conduit and valve through which water can be released. Interpolated along the exit conduit is a hydroelectric turbine which can convert the energy in the down flowing water into electrical energy. In an exemplary embodiment, the turbine includes bladed turbines. In an exemplary embodiment, the turbine includes an Archimedes helical screw turbine to retain the fish friendly design of the entire setup.

By employing multiple helical screw pumps and large stepped cisterns, vast amounts of (sea) water can be elevated to any desired height to generate hydroelectric power. Helical screw pumps generally operate at low revolutions per minute (RPM), often less than 50 rpm, and hence wear much better and last longer, thus requiring less maintenance than other positive displacement pumps.

In an exemplary embodiment, the wave energy capture device disclosed herein can be incorporated or built into cliff sides which generally have little recreational value, resulting in much of the operating mechanism being hidden from view while providing open shipping lanes and minimizing hazards to pelagic creatures.

The wave energy capture device disclosed herein is powered entirely by sea energy and using sea water. The wave energy capture device comprises a self-contained circuit that is a simple energy entrapment and containment mechanism, is ecologically friendly, and provides consistent energy day or night, in fair weather and in foul weather, and whether the sun shines or not.

In an exemplary embodiment, the wave energy capture device disclosed herein may be built into a sea side cliff via bore holes for the helical screws connected by underground cisterns. In an exemplary embodiment, the wave energy capture device disclosed herein may be built along a cliff modified into an inclined plane, which would accommodate the necessary angles of the screws, for example with the helical screw pumps angled at a range of 10 to 38 degrees, and more particularly, at a range of 22 to 25 degrees. In an exemplary embodiment, the helical screws may be approximately 3-4 meters in diameter and twenty meters in length; although the diameters and lengths of the helical screws can vary depending on need. Angles, diameters, lengths and numbers of helical screws employed per level can all be predetermined to optimize water flow for energy production and efficiency.

In an exemplary embodiment, the wave energy capture device comprises a plurality of Archimedes screws staggered in parallel powered by wave energy to lift water to heights. The water then flows from a reservoir back into the water source (e.g., the sea) thereby turning turbines and generating electricity. In an exemplary embodiment, the screws are about 10 meters in length and positioned so the top of one screw fills the bottom of another screw, and the first screw is arranged in ocean water and the last screw fills a cistern at the top. Each screw is powered by the up and down motion of waves which is converted into rotational motion via a piston type linkage or scotch yoke linkage and the rotation turns each screw. By staggering a plurality of screws, less force is required to turn each screw rather than one single screw. Thus, by including a plurality of screws, for example in series, rather than one single screw, the water weight and frictional forces can be spread out among several screws, ultimately attaining the same effect as a single long screw. In an exemplary embodiment, the screws may be placed in bore hole shafts at an angle adequately calculated, with perhaps an intervening cistern between screws. The screws of the present disclosure are fish friendly in that fish can enter and exit them without harm.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 10 is an elevational view of a point absorber.

DETAILED DESCRIPTION

Figure 1:
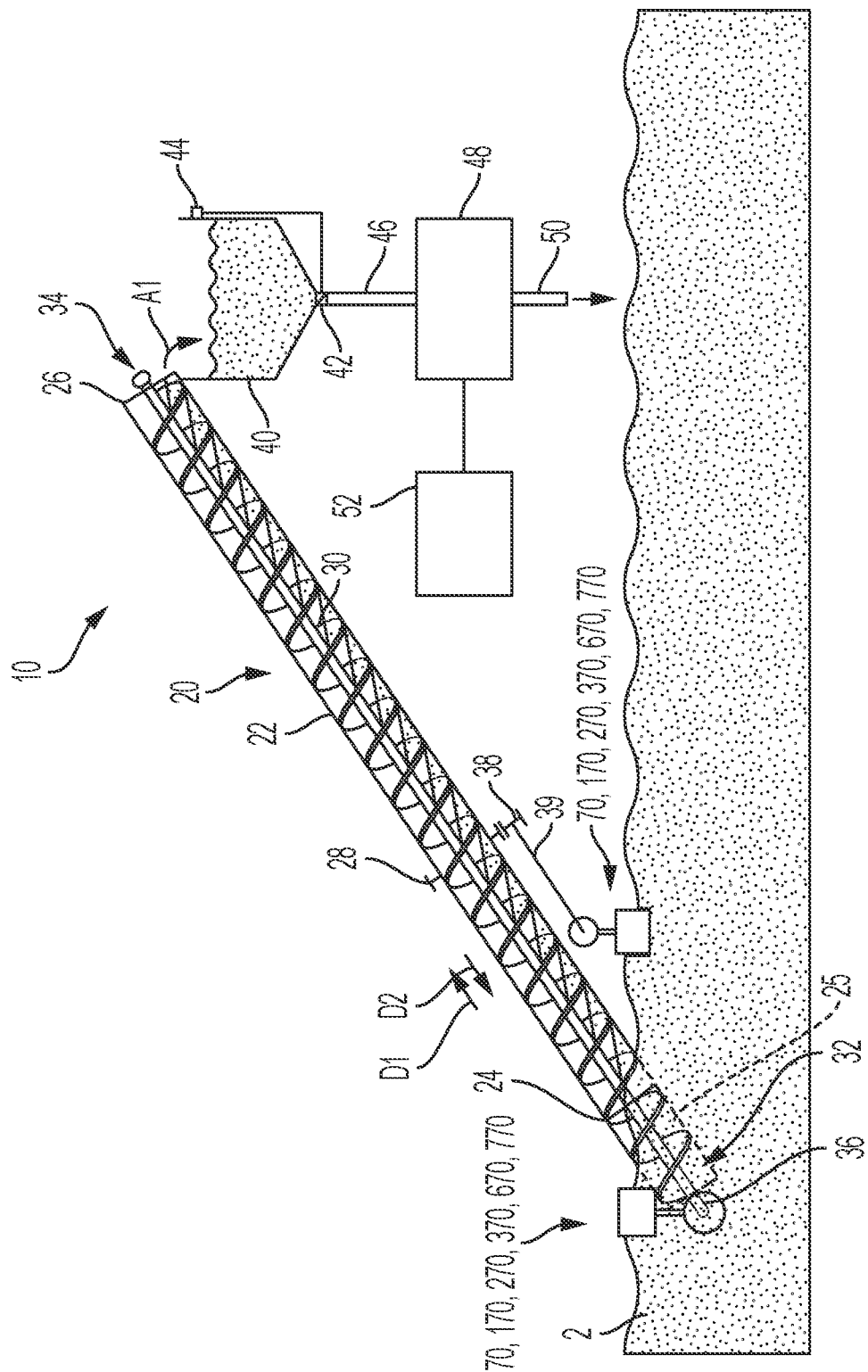
FIG. 1 is an elevational partial schematic view of a wave energy capture, storage, and conversion assembly.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element. A similar interpretation is intended when the phrase "used in at least one of:" is used herein.

By "non-rotatably connected" elements, it is meant that: the elements are connected so that whenever one of the elements rotate, all the elements rotate; and relative rotation between the elements is not possible. Radial and/or axial movement of non-rotatably connected elements with respect to each other is possible, but not required. By "rotatably connected" elements, we mean that: the elements are rotatable with respect to each other.

Point absorber as used herein is intended to mean a mechanism that converts the motion or movement of water (i.e., oscillatory movement of water or the flow of water) into rotary motion (i.e., rotational displacement).

Adverting now to the figures, FIG. 1 is an elevational partial schematic view of wave energy capture, storage, and conversion assembly 10, generally designated assembly 10. Assembly 10 generally comprises at least one Archimedes screw or screw pump assembly, for example, screw pump assembly 20, and at least one point absorber, for example, point absorber 70, 170, 270, 370, 670, 770. In an exemplary embodiment, assembly 10 further comprises cistern turbine 48, and/or generator 52.

Screw pump assembly 20 is a hydraulic machine used to pump water, and comprises case or tube 22 and screw or helical surface 30. Tube 22 at least partially encircles screw 30 and comprises end 24 and end 26. In an exemplary embodiment, tube 22 is concentrically arranged around screw 30. In an exemplary embodiment, tube 22 is a pipe that completely encircles screw 30. In an exemplary embodiment, tube 22 is a halfpipe that partially surrounds screw 30, for example, arranged concentric with and beneath screw 30. End 24 is arranged proximate to or in water or fluid 2. In an exemplary embodiment, end 24 is only partially submerged in water 2 to allow for air to enter tube 22 along with water. Water 2 is any body of water exhibiting movement, for example, an ocean, a lake, a river, a sea, etc. In an exemplary embodiment, water 2 may comprise waste (e.g., at a waste treatment plant). It should be appreciated that the more wave movement water 2 exhibits, the more energy assembly 10 will produce.

Screw 20 is a helical screw or surface arranged within and/or concentric with tube 22. Screw 20 comprises end 32 arranged proximate end 24 and end 34 arranged proximate end 26. In an exemplary embodiment, end 32 extends past end 24 in direction D2. In an exemplary embodiment, end 34 extends past end 26 in direction D1. End 32 is operatively arranged to be engaged with (i.e., submerged in) water 2. Screw 20 is operatively arranged to displace in a circumferential direction to displace water in direction D1 from end 32 to end 34. Specifically, screw 20 is arranged to pump water 2 through tube 22 in direction D1 to cistern 40.

In an exemplary embodiment, screw 30 and tube 22 are rotatably connected. In such embodiments, screw 30 displaces circumferentially as tube 22 remains stationary. Water is pumped through tube 22 in direction D1 and into cistern 40, as indicated by arrow A1. In particular, as screw 30 turns, end 32 scoops up a volume of water. This water is then pushed up tube 22 by the rotating helicoid until it pours out from top end 26 of tube 22. Rotation of screw should occur only in one circumferential direction, as rotation in the opposite circumferential direction would allow fluid within tube 22 to travel in direction D2.

Screw 30 is displaced circumferentially via one or more point absorbers, for example, point absorber 70, 170, 270, 370, 670, 770, as will be described in greater detail below. Screw 30 may be connected to point absorber 70, 170, 270, 370, 670, 770 via shaft 36. In an exemplary embodiment, shaft 36 connects end 32 to point absorber 70, 170, 270, 370, 670, 770. In an exemplary embodiment, end 34 may be connected to point absorber 70, 170, 270, 370, 670, 770. It should be appreciated that screw 30 may be connected to multiple point absorbers, connected in series or parallel, to more efficiently and consistently displace screw 30 in a circumferential direction.

In an exemplary embodiment, screw 30 and tube 22 are non-rotatably connected. In such embodiment, one of tube 22 and screw 30 is displaced in a circumferential direction, which results in the other of tube 22 and screw 30 being displaced in the circumferential direction. For example, point absorber 70, 170, 270, 370, 670, 770 may be connected to screw 30 to displace screw 30 and tube 22 circumferentially. Additionally or alternatively, point absorber 70, 170, 270, 370, 670, 770 may be connected to tube 22 to displace tube 22 and screw 30 circumferentially. In an exemplary embodiment, tube 22 comprises gear 28 non-rotatably connected thereto. Point absorber 70, 170, 270, 370, 670, 770 may be connected to gear 28 via shaft 39 and gear 38. It should be appreciated that displacement of both tube 22 and screw 30 will have the effect of displacing water through tube 22 in direction D1 and into cistern 40, as indicated by arrow A1.

As previously described, water is pumped through tube 22 in direction D1 into cistern 40, where it is stored. When desired, water stored in cistern 40 is released via valve 42. The water flows through tube 46, turbine 48, and tube 50 where it is returned to water 2. In an exemplary embodiment, cistern 40 comprises sensor 44 operatively arranged to detect a water level therein. When the water level in cistern 40 reaches a predetermined height, sensor 44 sends a signal to valve 42 (via a receiver) to open. In an exemplary embodiment, the valve 42 may remain open for a predetermined period of time (i.e., until all the water in cistern 40 is drained, or until the water level in cistern 40 falls below a predetermined height).

Turbine 48 is a rotary mechanical device that extracts energy from fluid flow and converts it into useful work. Specifically, fluid flows through turbine 48 via tube 46 and tube 50, wherein the fluid acts on blades or helical surfaces of a rotor therein to impart rotational energy on the rotor. Turbine 48 is connected to generator 50 to generate electrical power, as is known in the art. In an exemplary embodiment, turbine 48 comprises an Archimedes screw generator or screw turbine. The screw turbine includes one or more screws or helical surfaces that displace circumferentially as water or fluid flows down therethrough, via tube 46 and tube 50. The use of screw pump assembly 20 and screw turbine 48 may be desirable as it allows for fish to flow through assembly 10 and back to water 2 unharmed. Additionally, screw pump assembly 20 and screw turbine 48 allow for the passage of debris without damaging assembly 10. It should be appreciated that in an exemplary embodiment, assembly 10 comprises one or more screens to prevent fish or debris from moving through assembly 10, for example, screen 25 on end 24.

Figure 2:
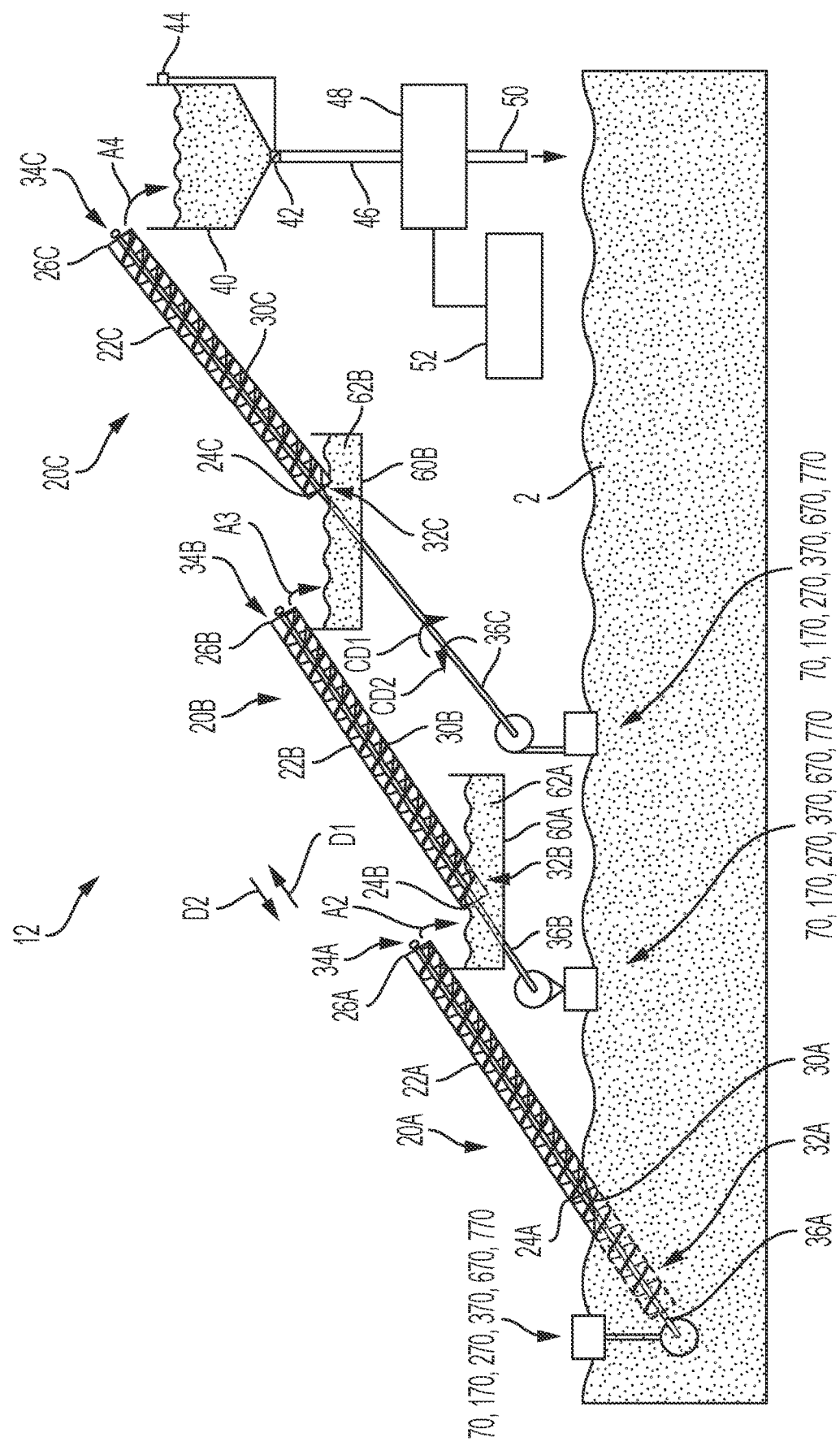
FIG. 2 is an elevational partial schematic view of a wave energy capture, storage, and conversion assembly.

FIG. 2 is an elevational partial schematic view of wave energy capture, storage, and conversion assembly 12, generally designated assembly 12. As shown, assembly 12 generally comprises at least one Archimedes screw or screw pump assembly, for example, screw pump assemblies 20A-C, and at least one point absorber, for example, point absorber 70, 170, 270, 370, 670, 770. As shown, screw pump assemblies 20A-C are arranged in series. In an exemplary embodiment, assembly 12 further comprises at least one cistern, for example, cistern 60A, 60A, and 40, turbine 48, and/or generator 52.

Screw pump assemblies 20A-C are substantially the same as screw pump assembly 20. Screw pump assembly 20A comprises case or tube 22A and screw or helical surface 30A. Tube 22A at least partially encircles screw 30A and comprises end 24A and end 26A. In an exemplary embodiment, tube 22A is concentrically arranged around screw 30A. In an exemplary embodiment, tube 22A is a pipe that completely encircles screw 30A. In an exemplary embodiment, tube 22A is a halfpipe that partially surrounds screw 30A, for example, arranged concentric with and beneath screw 30A. End 24A is arranged proximate to or in water or fluid 2. In an exemplary embodiment, end 24A is only partially submerged in water 2 to allow for air to enter tube 22A along with water.

Screw 20A is a helical screw or surface arranged within and/or concentric with tube 22A. Screw 20A comprises end 32A arranged proximate end 24A and end 34A arranged proximate end 26A. In an exemplary embodiment, end 32A extends past end 24A in direction D2. In an exemplary embodiment, end 34A extends past end 26A in direction D1. End 32A is operatively arranged to be engaged with (i.e., submerged in) water 2. Screw 20A is operatively arranged to displace in a circumferential direction to displace water in direction D1 from end 32A to end 34A. Specifically, screw 20A is arranged to pump water 2 through tube 22A in direction D1 to cistern or reservoir 60A.

In an exemplary embodiment, screw 30A and tube 22A are rotatably connected. In such embodiments, screw 30A displaces circumferentially as tube 22A remains stationary. Water is pumped through tube 22A in direction D1 and into cistern 60A, as indicated by arrow A2. In particular, as screw 30A turns, end 32A scoops up a volume of water. This water is then pushed up tube 22A by the rotating helicoid until it pours out from top end 26A of tube 22A. Rotation of screw 30A should occur only in one circumferential direction, as rotation in the opposite circumferential direction would allow fluid within tube 22A to travel in direction D2.

Screw 30A is displaced circumferentially via one or more point absorbers, for example, point absorber 70, 170, 270, 370, 670, 770, as will be described in greater detail below. Screw 30A may be connected to point absorber 70, 170, 270, 370, 670, 770 via shaft 36A. In an exemplary embodiment, shaft 36A connects end 32A to point absorber 70, 170, 270, 370, 670, 770. In an exemplary embodiment, end 34A may be connected to point absorber 70, 170, 270, 370, 670, 770. It should be appreciated that screw 30A may be connected to multiple point absorbers, connected in series or parallel, to more efficiently and consistently displace screw 30A in a circumferential direction.

In an exemplary embodiment, screw 30A and tube 22A are non-rotatably connected. In such embodiment, one of tube 22A and screw 30A is displaced in a circumferential direction, which results in the other of tube 22A and screw 30A being displaced in the circumferential direction. For example, point absorber 70, 170, 270, 370, 670, 770 may be connected to screw 30A to displace screw 30A and tube 22A circumferentially. Additionally or alternatively, point absorber 70, 170, 270, 370, 670, 770 may be connected to tube 22A to displace tube 22A and screw 30A circumferentially. It should be appreciated that displacement of both tube 22A and screw 30A will have the effect of displacing water through tube 22A in direction D1 and into cistern 60A, as indicated by arrow A2.

Screw pump assembly 20B comprises case or tube 22B and screw or helical surface 30B. Tube 22B at least partially encircles screw 30B and comprises end 24B and end 26B. In an exemplary embodiment, tube 22B is concentrically arranged around screw 30B. In an exemplary embodiment, tube 22B is a pipe that completely encircles screw 30B. In an exemplary embodiment, tube 22B is a halfpipe that partially surrounds screw 30B, for example, arranged concentric with and beneath screw 30B. End 24B is arranged proximate to or in water or fluid 62A stored in cistern 60A. In an exemplary embodiment, end 24B is only partially submerged in water 62A to allow for air to enter tube 22B along with water.

Screw 20B is a helical screw or surface arranged within and/or concentric with tube 22B. Screw 20B comprises end 32B arranged proximate end 24B and end 34B arranged proximate end 26B. In an exemplary embodiment, end 32B extends past end 24B in direction D2. In an exemplary embodiment, end 34B extends past end 26B in direction D1. End 32B is operatively arranged to be engaged with (i.e., submerged in) water 62A. Screw 20B is operatively arranged to displace in a circumferential direction to displace water in direction D1 from end 32B to end 34B. Specifically, screw 20B is arranged to pump water 62A through tube 22B in direction D1 to cistern or reservoir 60B.

In an exemplary embodiment, screw 30B and tube 22B are rotatably connected. In such embodiments, screw 30B displaces circumferentially as tube 22B remains stationary. Water is pumped through tube 22B in direction D1 and into cistern 60B, as indicated by arrow A3. In particular, as screw 30B turns, end 32B scoops up a volume of water. This water is then pushed up tube 22B by the rotating helicoid until it pours out from top end 26B of tube 22B. Rotation of screw 30B should occur only in one circumferential direction, as rotation in the opposite circumferential direction would allow fluid within tube 22B to travel in direction D2.

Screw 30B is displaced circumferentially via one or more point absorbers, for example, point absorber 70, 170, 270, 370, 670, 770, as will be described in greater detail below. Screw 30B may be connected to point absorber 70, 170, 270, 370, 670, 770 via shaft 36B. In an exemplary embodiment, shaft 36B connects end 32B to point absorber 70, 170, 270, 370, 670, 770. In an exemplary embodiment, end 34B may be connected to point absorber 70, 170, 270, 370, 670, 770. It should be appreciated that screw 30B may be connected to multiple point absorbers, connected in series or parallel, to more efficiently and consistently displace screw 30B in a circumferential direction.

In an exemplary embodiment, screw 30B and tube 22B are non-rotatably connected. In such embodiment, one of tube 22B and screw 30B is displaced in a circumferential direction, which results in the other of tube 22B and screw 30B being displaced in the circumferential direction. For example, point absorber 70, 170, 270, 370, 670, 770 may be connected to screw 30B to displace screw 30B and tube 22B circumferentially. Additionally or alternatively, point absorber 70, 170, 270, 370, 670, 770 may be connected to tube 22B to displace tube 22B and screw 30B circumferentially. It should be appreciated that displacement of both tube 22B and screw 30B will have the effect of displacing water through tube 22B in direction D1 and into cistern 60B, as indicated by arrow A3.

Screw pump assembly 20C comprises case or tube 22C and screw or helical surface 30C. Tube 22C at least partially encircles screw 30C and comprises end 24C and end 26C. In an exemplary embodiment, tube 22C is concentrically arranged around screw 30C. In an exemplary embodiment, tube 22C is a pipe that completely encircles screw 30C. In an exemplary embodiment, tube 22C is a halfpipe that partially surrounds screw 30C, for example, arranged concentric with and beneath screw 30C. End 24C is arranged proximate to or in water or fluid 62B stored in cistern 60B. In an exemplary embodiment, end 24C is only partially submerged in water 62B to allow for air to enter tube 22C along with water.

Screw 20C is a helical screw or surface arranged within and/or concentric with tube 22C. Screw 20C comprises end 32C arranged proximate end 24C and end 34C arranged proximate end 26C. In an exemplary embodiment, end 32C extends past end 24C in direction D2. In an exemplary embodiment, end 34C extends past end 26C in direction D1. End 32C is operatively arranged to be engaged with (i.e., submerged in) water 62B. Screw 20C is operatively arranged to displace in a circumferential direction to displace water in direction D1 from end 32C to end 34C. Specifically, screw 20C is arranged to pump water 62B through tube 22C in direction D1 to cistern 40.

In an exemplary embodiment, screw 30C and tube 22C are rotatably connected. In such embodiments, screw 30C displaces circumferentially as tube 22C remains stationary. Water is pumped through tube 22C in direction D1 and into cistern 40, as indicated by arrow A4. In particular, as screw 30C turns, end 32C scoops up a volume of water. This water is then pushed up tube 22C by the rotating helicoid until it pours out from top end 26C of tube 22C. Rotation of screw 30C should occur only in one circumferential direction, as rotation in the opposite circumferential direction would allow fluid within tube 22C to travel in direction D2.

Screw 30C is displaced circumferentially via one or more point absorbers, for example, point absorber 70, 170, 270, 370, 670, 770, as will be described in greater detail below. Screw 30C may be connected to point absorber 70, 170, 270, 370, 670, 770 via shaft 36C. In an exemplary embodiment, shaft 36C connects end 32C to point absorber 70, 170, 270, 370, 670, 770. In an exemplary embodiment, end 34C may be connected to point absorber 70, 170, 270, 370, 670, 770. It should be appreciated that screw 30C may be connected to multiple point absorbers, connected in series or parallel, to more efficiently and consistently displace screw 30C in a circumferential direction.

In an exemplary embodiment, screw 30C and tube 22C are non-rotatably connected. In such embodiment, one of tube 22C and screw 30C is displaced in a circumferential direction, which results in the other of tube 22C and screw 30C being displaced in the circumferential direction. For example, point absorber 70, 170, 270, 370, 670, 770 may be connected to screw 30C to displace screw 30C and tube 22C circumferentially. Additionally or alternatively, point absorber 70, 170, 270, 370, 670, 770 may be connected to tube 22C to displace tube 22C and screw 30C circumferentially. It should be appreciated that displacement of both tube 22C and screw 30C will have the effect of displacing water through tube 22C in direction D1 and into cistern 40, as indicated by arrow A4.

As previously described, water stored in cistern 40 is selectively released down through turbine 48 and back to water 2. Turbine 48 and generator 52 convert fluid flow in turbine 48 to electrical power. The use of screw pump assemblies 20A-C and screw turbine 48 may be desirable as it allows for fish to flow through assembly 12 and back to water 2 unharmed. Additionally, screw pump assemblies 20A-C and screw turbine 48 allow for the passage of debris without damaging assembly 12. It should be appreciated that in an exemplary embodiment, assembly 12 comprises one or more screens to prevent fish or debris from moving through assembly 12, for example, a screen on at least one of ends 24A, 24B, and 24C.

Figure 3:
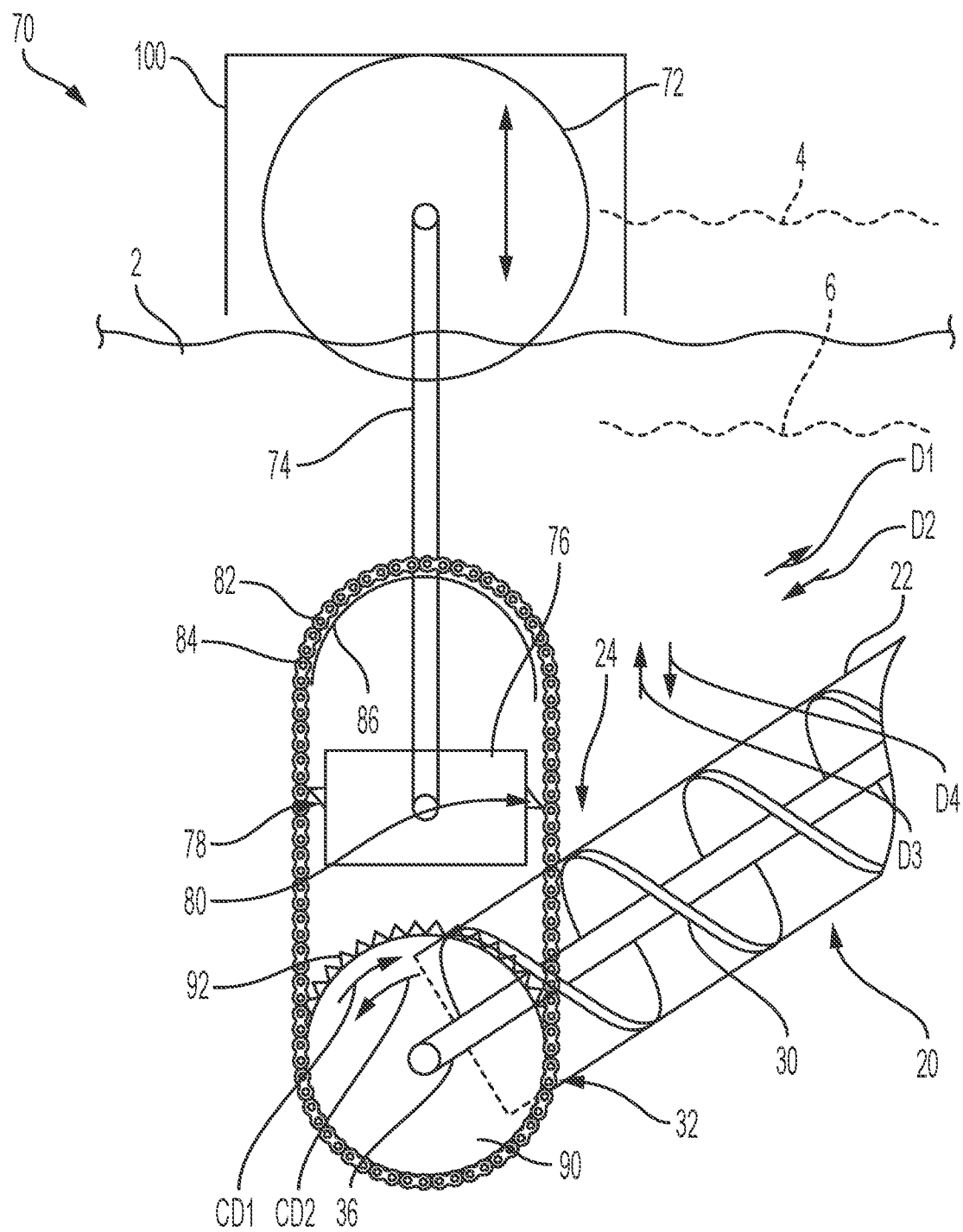
FIG. 3 is an elevational view of a point absorber.

FIG. 3 is an elevational view of point absorber 70. Point absorber 70 is operatively arranged to displace a shaft in a single circumferential direction, for example, circumferential direction CD1. Point absorber 70 generally comprises float 72, reciprocating element 76, chain or belt or line 82, and sprocket or gear or wheel 90. It should be appreciated that a line as used herein may include a chain, belt, string, wire, strap, cable, or the like. Float 72 is arranged to engage water 2 such that, as water 2 displaces, float 72 displaces generally in direction D3 and direction D4. Displacement of water 2 may occur via waves or tide (i.e., as indicated by line 4 and line 6). In an exemplary embodiment, point absorber 70 further comprises caisson casing 100. Caisson casing 100 may serve as an anchor or foundation for point absorber 70, for example, to maintain general positioning of float 72, sprocket 90, and/or the submerged end of the screw assembly. Caisson casing 100 may also maintain alignment between float 72 and sprocket 90. Reciprocating element 76 is connected to float 72 via shaft 74. In an exemplary embodiment, shaft 74 is pivotably connected to float 72. In an exemplary embodiment, shaft 74 is pivotably connected to reciprocating element 76.

Reciprocating element 76 is operatively arranged to be displaced generally in direction D3 and direction D4 (via float 72) and displace sprocket 90 in circumferential direction CD1. Reciprocating element 76 comprises pawl 78 and pawl 80. Pawls 78 and 80 are arranged to engage chain links 84 of chain 82. Specifically, pawl 78 is arranged to displace chain 82 when reciprocating element 76 is displaced in direction D3, but not displace chain 82 when reciprocating element 76 is displaced in direction D4. Pawl 80 is arranged to displace chain 82 when reciprocating element 76 is displaced in direction D4, but not displace chain 82 when reciprocating element 76 is displaced in direction D3. The arrangement of pawls 78 and 80 provide for constant displacement of chain 82, and thus sprocket 90, in a single direction regardless of the displacement direction of reciprocating element 76. In an exemplary embodiment, chain 82 is a polymer chain. In an exemplary embodiment, element 82 is a notched belt, wherein pawls 78 and 80 engage notches in notched belt 82 as described above.

Sprocket 90 comprises teeth 92 engaged with chain links 84 of chain 82. In an exemplary embodiment, point absorber 70 further comprises surface 86 engaged with chain 82. In an exemplary embodiment, surface 86 is a curvilinear plane slidably engaged with chain 82 to maintain tension within chain 82. In an exemplary embodiment, alternative or in addition to surface 86, point absorber 70 comprises another sprocket to maintain tension within chain 82. Sprocket 90 is non-rotatably connected to screw pump assembly 20 (or screw pump assembly 20A, 20B, 20C) for example, to end 32 (or end 32A, 32B, 32C) of screw 30 (or screw 30A, 30B, 30C), via shaft 36 (or shaft 36A, 36B, 36C). In an exemplary embodiment, sprocket 90 is connected to screw pump assembly 20 via a bevel gear. As reciprocating element 78 is displaced in direction D3 and direction D4, sprocket 90 and thus the screw pump assembly (e.g., screw 30) is displaced in circumferential direction CD1, thereby causing water to be pumped through tube 22 in direction D1. In an exemplary embodiment, sprocket 90 is non-rotatably connected to pump assembly 400, 500 via shaft 36.

Figure 4:
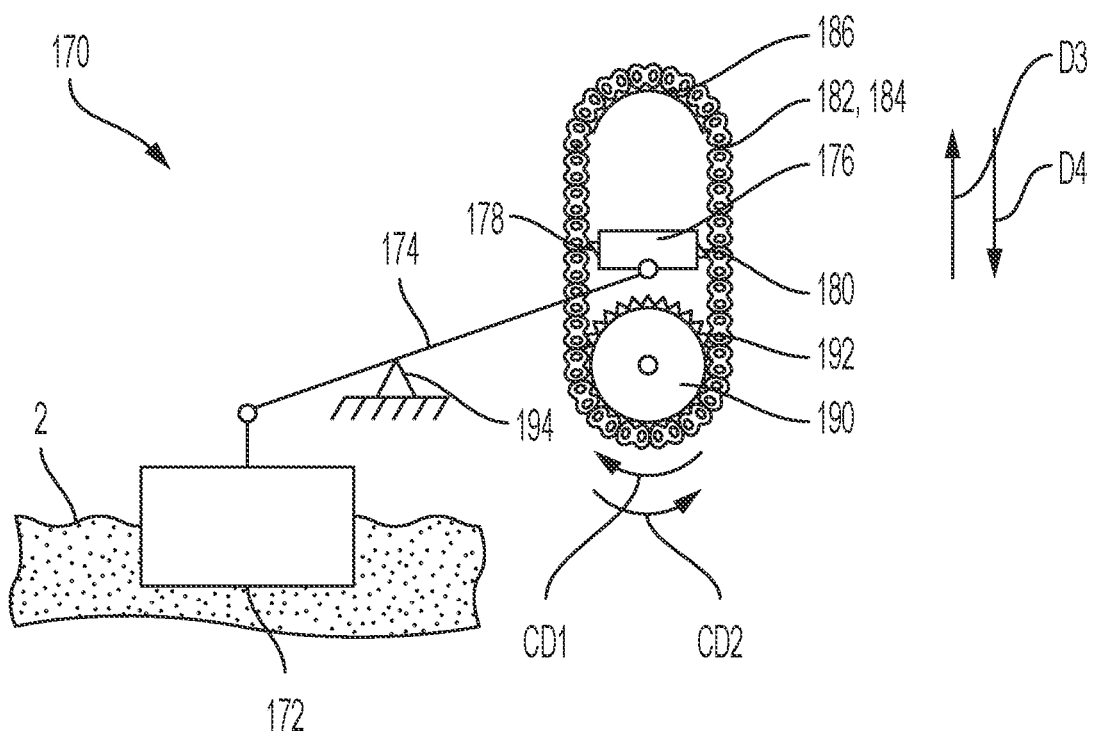
FIG. 4 is an elevational view of a point absorber.

FIG. 4 is an elevational view of point absorber 170. Point absorber 170 is operatively arranged to displace a shaft in a single circumferential direction, for example, circumferential direction CD1. Point absorber 170 generally comprises float 172, reciprocating element 176, chain or belt or line 182, and sprocket or gear or wheel 190. Float 172 is arranged to engage water 2 such that, as water 2 displaces, float 172 displaces generally in direction D3 and direction D4. Displacement of water 2 may occur via waves or tide. Reciprocating element 176 is connected to float 172 via shaft 174. In an exemplary embodiment, shaft 174 is pivotably connected to float 172. In an exemplary embodiment, shaft 174 is pivotably connected to reciprocating element 176. In an exemplary embodiment, and as shown, shaft 174 is engaged with fulcrum 194. Fulcrum 194 is operatively arranged to limit stress on reciprocating element 176 and/or multiply the displacement of float 172 for a larger reciprocating element 176 stroke.

Reciprocating element 176 is operatively arranged to be displaced generally in direction D3 and direction D4 (via float 172) and displace sprocket 190 in circumferential direction CD1. Reciprocating element 176 comprises pawl 178 and pawl 180. Pawls 178 and 180 are arranged to engage chain links 184 of chain 182. Specifically, pawl 178 is arranged to displace chain 182 when reciprocating element 176 is displaced in direction D3, but not displace chain 182 when reciprocating element 176 is displaced in direction D4. Pawl 180 is arranged to displace chain 182 when reciprocating element 176 is displaced in direction D4, but not displace chain 182 when reciprocating element 176 is displaced in direction D3. The arrangement of pawls 178 and 180 provide for constant displacement of chain 182, and thus sprocket 190, in a single direction regardless of the displacement direction of reciprocating element 176. In an exemplary embodiment, chain 182 is a polymer chain. In an exemplary embodiment, element 182 is a notched belt, wherein pawls 178 and 180 engage notches in notched belt 182 as described above.

Sprocket 190 comprises teeth 192 engaged with chain links 184 of chain 182. In an exemplary embodiment, point absorber 170 further comprises surface 186 engaged with chain 182. In an exemplary embodiment, surface 186 is a curvilinear plane slidably engaged with chain 182 to maintain tension within chain 182. In an exemplary embodiment, alternative or in addition to surface 186, point absorber 170 comprises another sprocket to maintain tension within chain 182. Sprocket 190 is non-rotatably connected to screw pump assembly 20 (or screw pump assembly 20A, 20B, 20C) for example, to end 32 (or end 32A, 32B, 32C) of screw 30 (or screw 30A, 30B, 30C), via shaft 36 (or shaft 36A, 36B, 36C). In an exemplary embodiment, sprocket 190 is connected to screw pump assembly 20 via a bevel gear. As reciprocating element 176 is displaced in direction D3 and direction D4, sprocket 190 and thus the screw pump assembly (e.g., screw 30) is displaced in circumferential direction CD1, thereby causing water to be pumped through tube 22 in direction D1. In an exemplary embodiment, sprocket 190 is non-rotatably connected to pump assembly 400, 500 via shaft 36.

Figure 5:
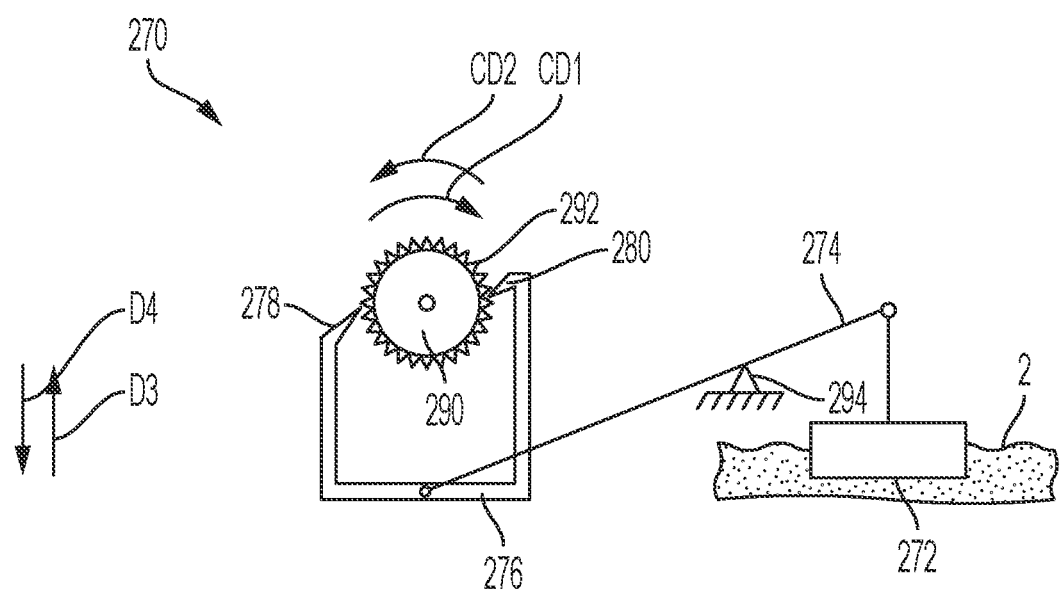
FIG. 5 is an elevational view of a point absorber.

FIG. 5 is an elevational view of point absorber 270. Point absorber 270 is operatively arranged to displace a shaft in a single circumferential direction, for example, circumferential direction CD1. Point absorber 270 generally comprises float 272, arm or yoke 276, and sprocket or gear or wheel 290. Float 272 is arranged to engage water 2 such that, as water 2 displaces, float 272 displaces generally in direction D3 and direction D4. Displacement of water 2 may occur via waves or tide. Arm 276 is connected to float 272 via shaft 274. In an exemplary embodiment, shaft 274 is pivotably connected to float 272. In an exemplary embodiment, shaft 274 is pivotably connected to arm 276. In an exemplary embodiment, and as shown, shaft 274 is engaged with fulcrum 294. Fulcrum 294 is operatively arranged to limit stress on arm 276 and/or multiply the displacement of float 272 for a larger arm 276 stroke.

Arm 276 is operatively arranged to be displaced generally in direction D3 and direction D4 (via float 272) and displace sprocket 290 in circumferential direction CD1. Arm 276 comprises portion 278 and portion 280. Portions 278 and 280 are arranged to engage teeth 292 of sprocket 290. Specifically, portion 278 is arranged to displace sprocket 290 when arm 276 is displaced in direction D3, but not displace sprocket 290 when arm 276 is displaced in direction D4. Portion 280 is arranged to displace sprocket 290 when arm 276 is displaced in direction D4, but not displace sprocket 290 when arm 276 is displaced in direction D3. The arrangement of portions 278 and 280 provide for constant displacement of sprocket 290 in a single direction, for example circumferential direction CD1, regardless of the displacement direction of arm 276.

Sprocket 290 is non-rotatably connected to screw pump assembly 20 (or screw pump assembly 20A, 20B, 20C) for example, to end 32 (or end 32A, 32B, 32C) of screw 30 (or screw 30A, 30B, 30C), via shaft 36 (or shaft 36A, 36B, 36C). In an exemplary embodiment, sprocket 290 is connected to screw pump assembly 20 via a bevel gear. As arm 276 is displaced in direction D3 and direction D4, sprocket 290 and thus the screw pump assembly (e.g., screw 30) is displaced in circumferential direction CD1, thereby causing water to be pumped through tube 22 in direction D1. In an exemplary embodiment, sprocket 290 is non-rotatably connected to pump assembly 400, 500 via shaft 36.

Figure 6:
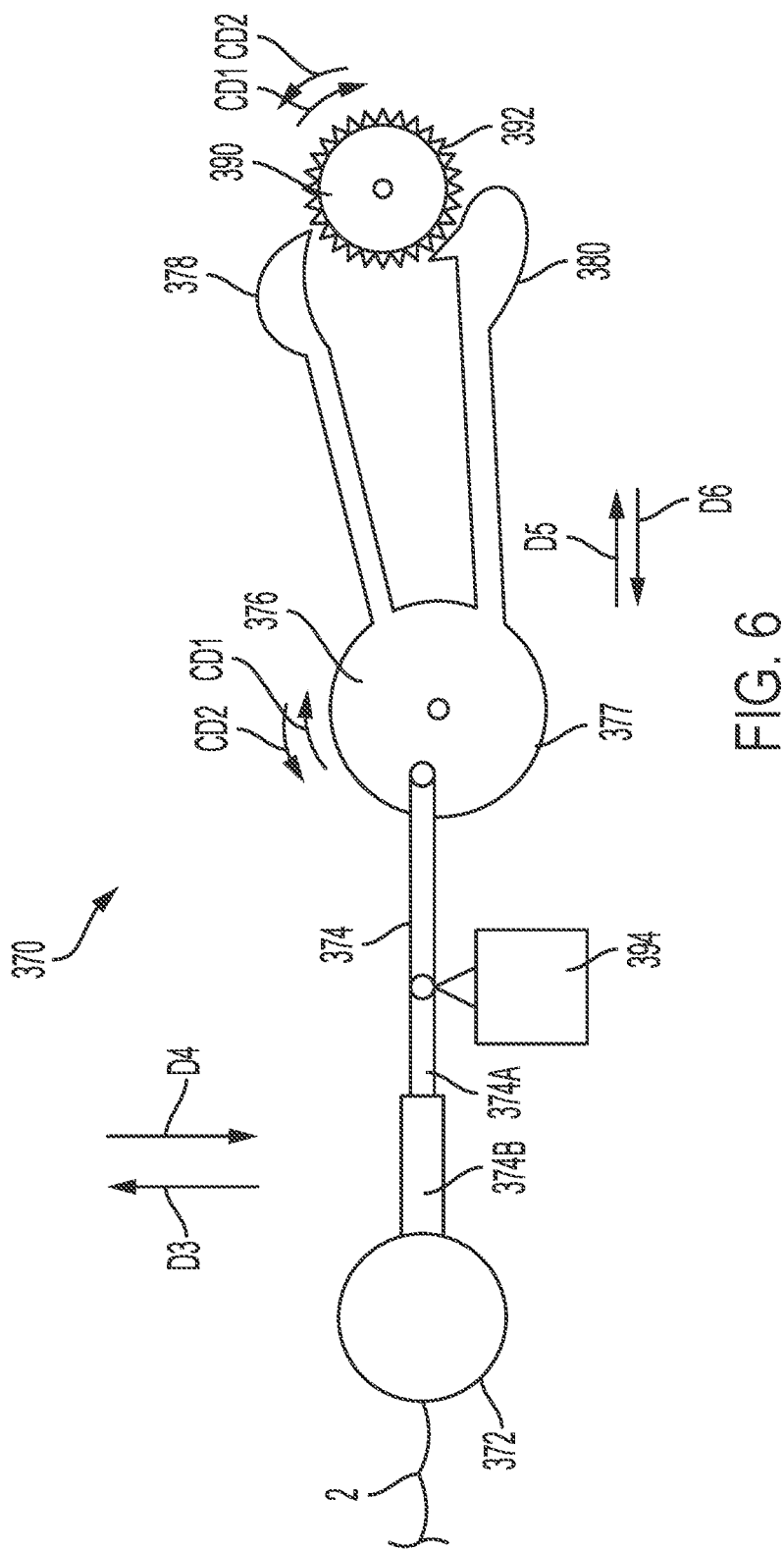
FIG. 6 is an elevational view of a point absorber.

FIG. 6 is an elevational view of point absorber 370. Point absorber 370 is operatively arranged to displace a shaft in a single circumferential direction, for example, circumferential direction CD1. Point absorber 370 generally comprises float 372, arm or yoke 376, and sprocket or gear or wheel 390. Float 372 is arranged to engage water 2 such that, as water 2 displaces, float 372 displaces generally in direction D3 and direction D4. Displacement of water 2 may occur via waves or tide. Arm 376 is connected to float 372 via shaft 374. In an exemplary embodiment, shaft 374 is pivotably connected to float 372. In an exemplary embodiment, shaft 374 is pivotably connected to arm 376. In an exemplary embodiment, and as shown, shaft 374 is engaged with fulcrum 394. Fulcrum 394 is operatively arranged to limit stress on arm 376 and/or multiply the displacement of float 372 for a larger arm 376 stroke. In an exemplary embodiment, shaft 374 comprises a plurality of telescopingly engaged shafts. For example, shaft 374 comprises portion 374A and portion 374B telescopingly engaged. Such telescoping engagement allows for reduced stress on arm 376.

Arm 376 is operatively arranged to be displaced generally in direction D5 and direction D6, as float 372 is displaced in direction D3 and direction D4, and displace sprocket 390 in circumferential direction CD1. Arm 376 comprises cam portion 377. Cam portion 377 converts rotary motion imparted thereon by float 372 and shaft 374 into linear motion (i.e., of arm 376 in directions D5 and D6). Arm 376 comprises portion 378 and portion 380. Portions 378 and 380 are arranged to engage teeth 392 of sprocket 390. Specifically, portion 378 is arranged to displace sprocket 390 when arm 376 is displaced in direction D5, but not displace sprocket 390 when arm 376 is displaced in direction D6. Portion 380 is arranged to displace sprocket 390 when arm 376 is displaced in direction D6, but not displace sprocket 390 when arm 376 is displaced in direction D5. The arrangement of portions 378 and 380 provide for constant displacement of sprocket 390 in a single direction, for example circumferential direction CD1, regardless of the displacement direction of arm 376. In an exemplary embodiment, directions D5 and D6 are perpendicular to directions D3 and D4.

Sprocket 390 is non-rotatably connected to screw pump assembly 20 (or screw pump assembly 20A, 20B, 20C) for example, to end 32 (or end 32A, 32B, 32C) of screw 30 (or screw 30A, 30B, 30C), via shaft 36 (or shaft 36A, 36B, 36C). In an exemplary embodiment, sprocket 390 is connected to screw pump assembly 20 via a bevel gear. As arm 376 is displaced in direction D5 and direction D6, sprocket 390 and thus the screw pump assembly (e.g., screw 30) is displaced in circumferential direction CD1, thereby causing water to be pumped through tube 22 in direction D1. In an exemplary embodiment, sprocket 390 is non-rotatably connected to pump assembly 400, 500 via shaft 36.

Figure 7:
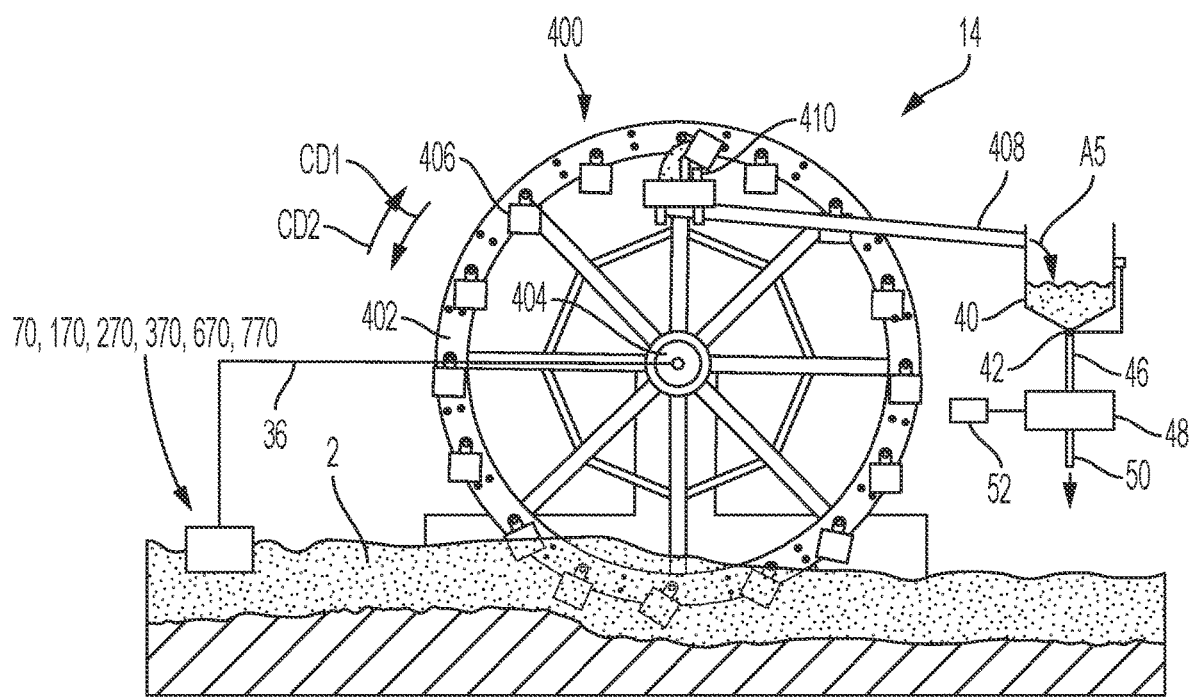
FIG. 7 is an elevational view of a wave energy capture, storage, and conversion assembly.

FIG. 7 is an elevational view of wave energy capture, storage, and conversion assembly, generally designated assembly 14. As shown, assembly 14 generally comprises at least one wheel pump assembly, for example, wheel pump assembly 400, and at least one point absorber, for example, point absorber 70, 170, 270, 370, 670, 770. In an exemplary embodiment, assembly 14 further comprises at least one cistern, for example, cistern 40, turbine 48, and/or generator 52.

Wheel pump assembly 400 generally comprises wheel 402 and trough or passageway or pipe 408. Wheel 402 comprises hub 404 and a plurality of buckets 406. Wheel 402 rotates about hub or axis 404. Buckets 406 are pivotably arranged about the outer radius of wheel 402 to engage and capture water 2. Hub 402 is arranged to be connected to point absorber 70, 170, 270, 370, 670, 770, for example via shaft 36. Point absorber 70, 170, 270, 370, 670, 770 is arranged to displace wheel 402 in a circumferential direction, for example, in circumferential direction CD1. As wheel 402 is displaced circumferentially, buckets 406 scoop up water 2. Buckets 406 then engage protrusion 410 and dump the water into passageway 408. Water flows through passageway 408 and into cistern 40, as indicated by arrow A5.

As previously described, water stored in cistern 40 is selectively released down through turbine 48 and back to water 2. Turbine 48 and generator 52 convert fluid flow in turbine 48 to electrical power. The use of wheel pump assembly 400 and screw turbine 48 may be desirable as it allows for fish to flow through assembly 14 and back to water 2 unharmed. Additionally, wheel pump assembly 400 and screw turbine 48 allow for the passage of debris without damaging assembly 14.

Figure 8:
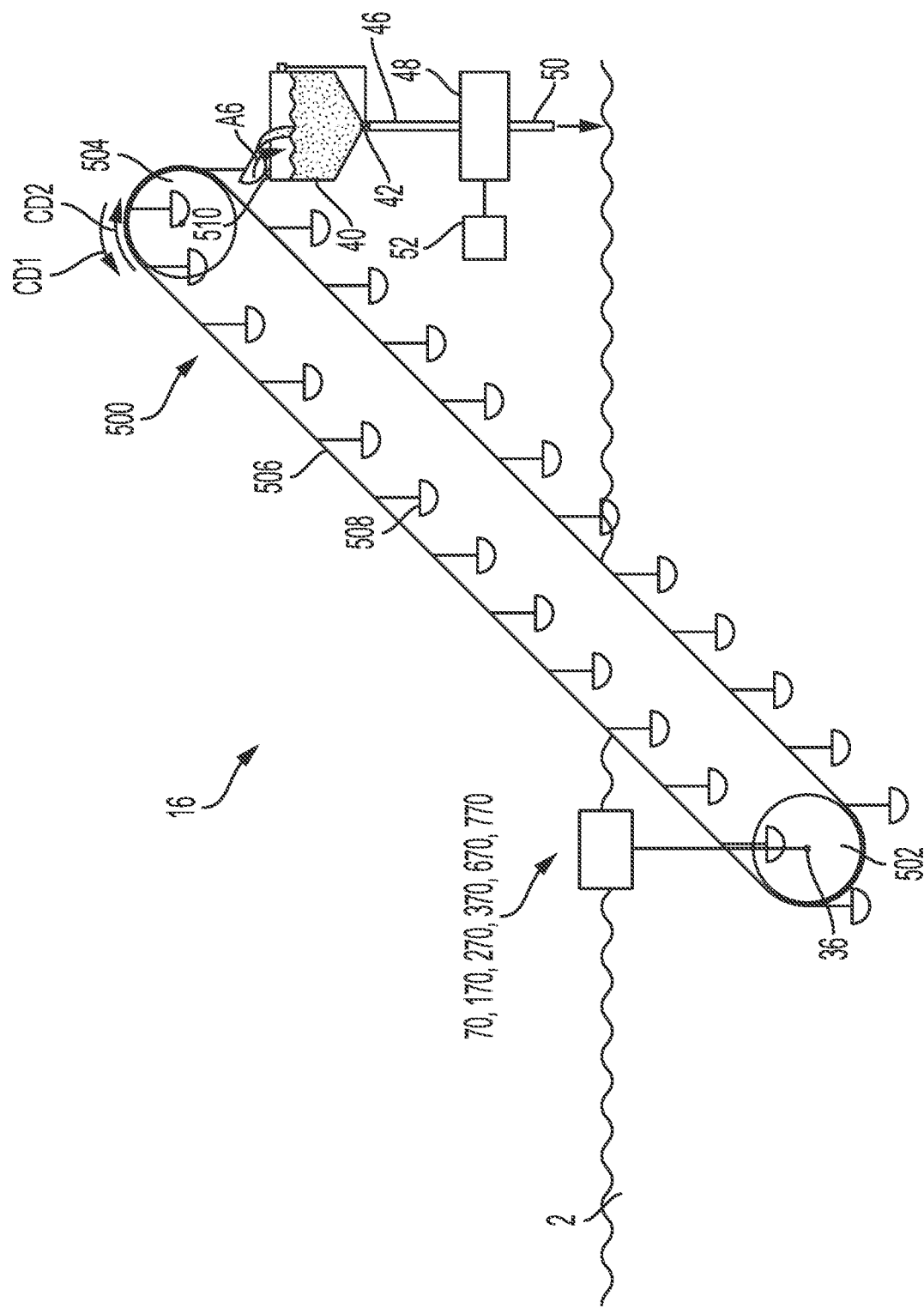
FIG. 8 is an elevational view of a wave energy capture, storage, and conversion assembly.

FIG. 8 is an elevational view of wave energy capture, storage, and conversion assembly, generally designated assembly 16. As shown, assembly 16 generally comprises at least one pump assembly, for example, pump assembly 500, and at least one point absorber, for example, point absorber 70, 170, 270, 370, 670, 770. In an exemplary embodiment, assembly 16 further comprises at least one cistern, for example, cistern 40, turbine 48, and/or generator 52.

Pump assembly 500 generally comprises sprocket or gear or wheel 502, sprocket or gear or wheel 504, and chain or belt or line 506. Line 506 is non-rotatably connected to wheels 502 and 504 such that as wheel 502, 504 is displaced circumferentially, line 506 displaces in direction D1, D2. Pump assembly 500 further comprises a plurality of buckets 508. Buckets are pivotably connected to line 506 to engage and capture water 2. Wheel 502 (and/or wheel 504) is arranged to be connected to point absorber 70, 170, 270, 370, 670, 770, for example via shaft 36. Point absorber 70, 170, 270, 370, 670, 770 is arranged to displace wheel 502 in a circumferential direction, and thus point absorber 70, 170, 270, 370, 670, 770 is arranged to displace line 506 to carry buckets 508 from water 2 to cistern 40. As wheel 502 is displaced circumferentially, buckets 508 scoop up water 2. Buckets 508 then engage protrusion or edge 510 and dump the water into cistern 40, as indicated by arrow A6.

As previously described, water stored in cistern 40 is selectively released down through turbine 48 and back to water 2. Turbine 48 and generator 52 convert fluid flow in turbine 48 to electrical power. The use of pump assembly 500 and screw turbine 48 may be desirable as it allows for fish to flow through assembly 16 and back to water 2 unharmed. Additionally, pump assembly 500 and screw turbine 48 allow for the passage of debris without damaging assembly 16.

Figure 9:
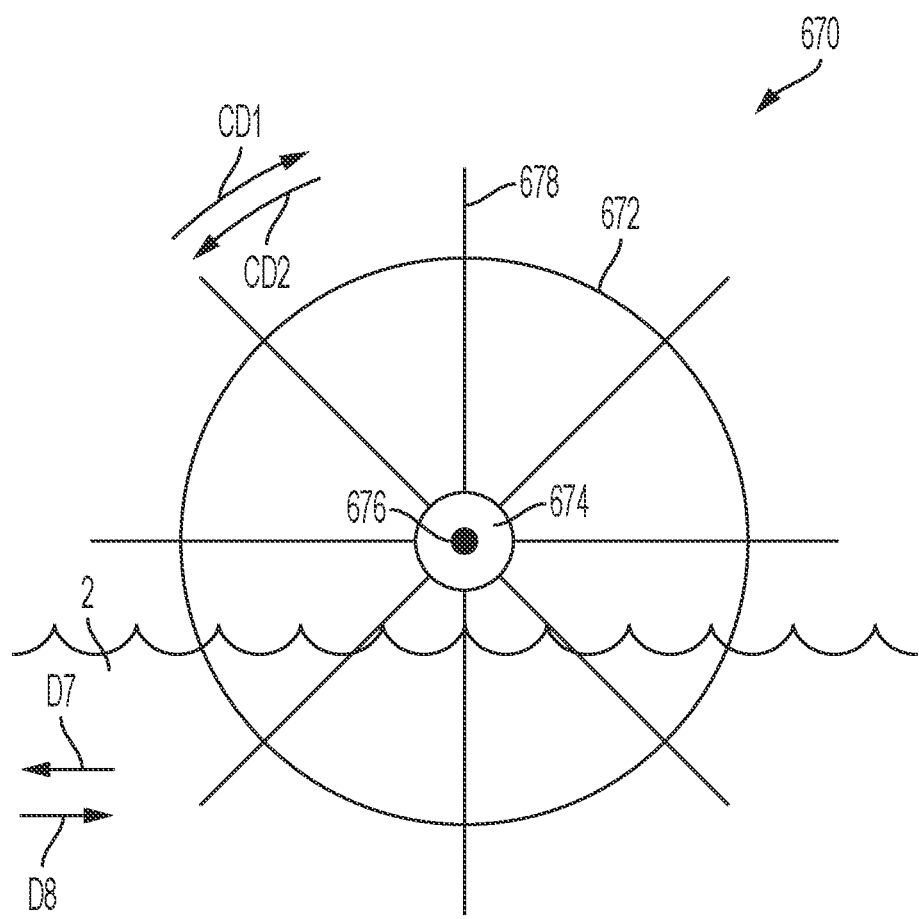
FIG. 9 is an elevational view of a point absorber.

FIG. 9 is an elevational view of point absorber 670. Point absorber 670 is operatively arranged to displace a shaft in a single circumferential direction, for example, circumferential direction CD1. Point absorber 670 is a water wheel generally comprising wheel 672. Wheel 672 comprises hub 274 and a plurality of paddles 678. Paddles 678 are radially arranged on wheel 672 to engage water 2. Hub 674 is arranged to be connected to a pump assembly, for example, screw pump assembly 20, 20A, 20B, 20C or wheel pump assembly 400. For example, point absorber 670 may comprise shaft 676 non-rotatably connected to hub 674, wherein shaft 676 is connected to screw pump assembly 20, 20A, 20B, 20C or wheel pump assembly 400. As water 2 flows in direction D7, paddles 678 engage water 2 such that wheel 672, hub 674, and shaft 676 displaces in circumferential direction CD1. As water 2 flows in direction D8, paddles 678 engage water 2 such that wheel 672, hub 674, and shaft 676 displaces in circumferential direction CD2. In an exemplary embodiment, shaft 676 is connected to screw pump assembly 20, 20A, 20B, 20C or wheel pump assembly 400 via one or more gears. Point absorber 670 is operatively arranged to displace screw pump assembly 20, 20A, 20B, 20C in a single circumferential direction, for example, circumferential direction CD1, thereby causing water to be pumped through tube 22 in direction D1. Likewise, point absorber 670 is operatively arranged to displace pump assembly 400, 500 in a single circumferential direction, for example, circumferential direction CD1, thereby causing water to be pumped up and into cistern 40. In an exemplary embodiment, point absorber 670 is arranged in a river, stream, straight, or other moving body of water.

FIG. 10 is an elevational view of point absorber 770. Point absorber 770 is operatively arranged to displace a shaft (e.g., shaft 778) in a single circumferential direction, for example, circumferential direction CD1. Point absorber 770 generally comprises float 772, reciprocating element 776, chain or belt or line 782, sprocket or gear or wheel 786, and sprocket or gear or wheel 790. Float 772 is arranged to engage water 2 such that, as water 2 displaces, float 772 displaces generally in direction D3 and direction D4. Displacement of water 2 may occur via waves or tide. In an exemplary embodiment, point absorber 770 further comprises caisson casing 100. Caisson casing 100 may serve as an anchor or foundation for point absorber 770, for example, to maintain general positioning of float 772. Caisson casing 100 may also house and protect float 772, for example, from the sun, rain, and other elements of weather. Reciprocating element 776 is connected to float 772 via shaft 774. In an exemplary embodiment, shaft 774 is pivotably connected to float 772. In an exemplary embodiment, shaft 774 is pivotably connected to reciprocating element 776. In an exemplary embodiment, and as shown, shaft 774 is engaged with fulcrum 794. Fulcrum 794 is operatively arranged to limit stress on reciprocating element 776 and/or multiply the displacement of float 772 for a larger reciprocating element 776 stroke.

Reciprocating element 776 is operatively arranged to be displaced generally in direction D3 and direction D4 (via float 772) and displace sprocket 790 in circumferential direction CD1. Reciprocating element 776 comprises pawl 779 and pawl 780. Pawls 778 and 780 are arranged to engage chain links 784 of chain 782. Specifically, pawl 779 is arranged to displace chain 782 when reciprocating element 776 is displaced in direction D9, but not displace chain 782 when reciprocating element 776 is displaced in direction D10. Pawl 780 is arranged to displace chain 782 when reciprocating element 776 is displaced in direction D10, but not displace chain 782 when reciprocating element 776 is displaced in direction D9. The arrangement of pawls 778 and 780 provide for constant displacement of chain 782, and thus sprocket 790, in a single direction regardless of the displacement direction of reciprocating element 776. In an exemplary embodiment, chain 782 is a polymer chain. In an exemplary embodiment, element 782 is a notched belt, wherein pawls 778 and 780 engage notches in notched belt 782 as described above.

In an exemplary embodiment, point absorber 770 further comprises curvilinear guide 796. Guide 796 is operatively arranged to hold chain 782 in a generally curvilinear geometry, as shown. As such, guide 796 and chain 782 exhibit a curvilinear path having a radius that is the same as the radius of travel of reciprocating element 776. The normal path of the distal end of shaft 774 follows an arc upon displacement about fulcrum 794, and thus chain 782 is shaped to exact the displacement arc of the distal end of shaft 774 via guide 796. Moreover, the arrangement of shaft 774 about fulcrum 794 increases the magnitude and speed of reciprocating element 776. In an exemplary embodiment, the fulcrum 794 is arranged about shaft 774 such that the speed and magnitude of reciprocating element 776 produces an angular velocity on shaft 778 in the range of 1,500-1,900 rpm.

Sprocket 790 comprises teeth 792 engaged with chain links 784 of chain 782. In an exemplary embodiment, point absorber 770 further comprises sprocket 786 including teeth 788 engaged with chain 782. In an exemplary embodiment, sprocket 786 is operatively arranged to maintain tension within chain 782. In an exemplary embodiment, alternative or in addition to sprocket 786, point absorber 770 comprises a curvilinear surface arranged to maintain tension within chain 782. In an exemplary embodiment, sprocket 790 is non-rotatably connected to screw pump assembly 20 (or screw pump assembly 20A, 20B, 20C) for example, to end 32 (or end 32A, 32B, 32C) of screw 30 (or screw 30A, 30B, 30C), via shaft 36 (or shaft 36A, 36B, 36C). In an exemplary embodiment, sprocket 190 is connected to screw pump assembly 20 via a bevel gear. In an exemplary embodiment, sprocket 790 is non-rotatably connected to pump assembly 400, 500 via shaft 36. As reciprocating element 776 is displaced in direction D3 and direction D4, sprocket 790 and thus the pump assembly is displaced in circumferential direction CD1, thereby causing water to be displaced to a higher elevation (e.g., cistern 40).

In an exemplary embodiment, sprocket 790 is non-rotatably connected to shaft 778 to input mechanical work into generator 802. Generator 802 is a rotary electrical generator. Shaft 802 is operatively arranged to deliver rotational motion to generator 802 such that generator 802 produces electricity.

In an exemplary embodiment, shaft 778 may further comprise flywheel 800. Flywheel 800 serves to smooth out the pulses of energy provided by point absorber 770, and store energy for when point absorber 770 is no longer supplying energy. For example, when gear 790 stops moving, the energy stored in flywheel 800 will continue to rotate shaft 778 due to the energy stored in flywheel 800, thereby continuing to produce electricity via generator 802 or pump water via pump 20, 400, 500. To further facilitate such continued rotation of shaft 778, shaft 778 may be connected to sprocket 790 via a freewheel connection. By freewheel connection, it is meant that as point absorber 770, for example gear 790, displaces in a first circumferential direction, shaft 778 displaces in the first circumferential, but when gear 790 stops moving, shaft 778 may continue to displace in the first circumferential direction.

An example of a freewheel device or connection comprises two saw-toothed, spring-loaded discs pressing against each other with the toothed sides together, somewhat like a ratchet. Rotating in one direction, the saw teeth of the drive disc lock with the teeth of the driven disc, making it rotate at the same speed. If the drive disc slows down or stops rotating, the teeth of the driven disc slip over the drive disc teeth and continue rotating, producing a characteristic clicking sound proportionate to the speed difference of the driven gear relative to that of the (slower) driving gear.

Another example of a freewheel device or connection comprises spring-loaded steel rollers or detents inside a driven cylinder. Rotating in one direction, the rollers lock with the cylinder making it rotate in unison. Rotating slower, or in the other direction, the steel rollers just slip inside the cylinder.

Another example of a freewheel device or connection, and that used in most bicycle freewheels, comprises an internally step-toothed drum with two or more spring-loaded, hardened steel pawls to transmit the load. More pawls help spread the wear and give greater reliability although, unless the device is made to tolerances not normally found in bicycle components, simultaneous engagement of more than two pawls is rarely achieved.

It should be appreciated that various materials may be used for elements of the assemblies disclosed here, for example, polymers, synthetic fibers, duplex steel, etc. Such materials are resistant to corrosion from water and salt water. Certain materials are also lighter and less prone to rust.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

2 Water or fluid
4 Line
6 Line
10 Wave energy capture, storage, and conversion assembly
12 Wave energy capture, storage, and conversion assembly
14 Wave energy capture, storage, and conversion assembly
16 Wave energy capture, storage, and conversion assembly
20 Archimedes screw or screw pump assembly
20A Archimedes screw or screw pump assembly
20B Archimedes screw or screw pump assembly
20C Archimedes screw or screw pump assembly
22 Case or tube
22A Case or tube
22B Case or tube
22C Case or tube
24 End
24A End
24B End
24C End
25 Screen
26 End
26A End
26B End
26C End
28 Gear or wheel
30 Screw or helical surface
30A Screw or helical surface
30B Screw or helical surface
30C Screw or helical surface
32 End
32A End
32B End
32C End
34 End
34A End
34B End
34C End
36 Shaft
36A Shaft
36B Shaft
36C Shaft
38 Gear or wheel
39 Shaft
40 Cistern
42 Valve
44 Sensor
46 Pipe
48 Turbine
50 Pipe
52 Generator
60A Reservoir
60B Reservoir
62A Water or fluid
62B Water or fluid
70 Point absorber
72 Float
74 Shaft
76 Reciprocating element
78 Pawl
80 Pawl
82 Chain or belt or line
84 Chain links
86 Surface
90 Sprocket or gear or wheel
92 Teeth 100 Caisson casing
170 Point absorber
172 Float
174 Shaft
176 Reciprocating element
178 Pawl
180 Pawl
182 Chain or belt or line
184 Chain links
186 Surface
190 Sprocket or gear or wheel
192 Teeth
194 Fulcrum
270 Point absorber
272 Float
274 Shaft
276 Yoke or arm
278 Portion
280 Portion
290 Sprocket or gear or wheel
292 Teeth
294 Fulcrum
370 Point absorber
372 Float
374 Shaft
374A Portion
374B Portion
376 Yoke or arm
377 Cam portion
378 Portion
380 Portion
390 Sprocket or gear or wheel
392 Teeth
394 Fulcrum
400 Wheel pump assembly
402 Wheel
404 Hub
406 Buckets
408 Trough or passageway
410 Protrusion
500 Pump assembly
502 Sprocket or gear or wheel
504 Sprocket or gear or wheel
506 Chain or belt or line
508 Buckets
510 Protrusion or edge
670 Point absorber
672 Wheel
674 Hub
676 Shaft
678 Paddles
770 Point absorber
772 Float
774 Shaft
776 Reciprocating element
778 Shaft
779 Pawl
780 Pawl
782 Chain or belt or line
784 Chain links
786 Sprocket or gear or wheel
788 Teeth
790 Sprocket or gear or wheel
792 Teeth
794 Fulcrum
796 Guide
798 Shaft
800 Flywheel
802 Generator
A1 Arrow
A2 Arrow
A3 Arrow
A4 Arrow
A5 Arrow
A6 Arrow
CD1 Circumferential direction
CD2 Circumferential direction
D1 Direction
D2 Direction
D3 Direction
D4 Direction
D5 Direction
D6 Direction
D7 Direction
D8 Direction
D9 Direction
D10 Direction

What is claimed is:

1. A wave energy capture, storage, and conversion assembly, comprising:
at least one pump assembly;
a point absorber operatively arranged to displace the at least one pump assembly in a first circumferential direction;
a float;
a wheel connected to the float, wherein displacement of the float in a first direction and a second direction displaces the wheel in the first circumferential direction;
a reciprocating element pivotably connected to the float; and
a line engaged with the reciprocating element and the wheel, wherein the reciprocating element comprises at least one pawl operatively arranged to:
engage the line as the reciprocating element is displaced in the first direction; and
disengage the line as the reciprocating element is displaced in the second direction, opposite the first direction.

2. The assembly as recited in claim 1, wherein when the at least one pump assembly is displaced in the first circumferential direction, the at least one pump assembly displaces fluid from a first altitude to a second altitude, the second attitude being greater than the first altitude.

3. The assembly as recited in claim 1, wherein the at least one pump assembly comprises a screw pump assembly, including:
a screw comprising a first end and a second end; and
a tube at least partially encircling the screw.

4. The assembly as recited in claim 3, wherein the at least one point absorber is operatively arranged to displace the screw in the first circumferential direction to displace fluid.

5. The assembly as recited in claim 1, wherein the at least one pump assembly comprises:
a first screw pump assembly; and
a second screw pump assembly, the first screw pump assembly and second screw pump assembly arranged in series.

6. The assembly as recited in claim 5, wherein:
the first screw pump assembly is operatively arranged to displace fluid from a first body of water to a first cistern; and the second screw pump assembly is operatively arranged to displace fluid from the first cistern to a second cistern.

7. The assembly as recited in claim 1, further comprising a cistern, wherein the at least one pump assembly displaces water from a first body of water to the cistern.

8. The assembly as recited in claim 7, further comprising a turbine connected to the cistern.

9. The assembly as recited in claim 1, wherein the at least one pump assembly comprises a pump assembly, including:
 a line; and
 a plurality of buckets pivotably connected to the line.

10. The assembly as recited in claim 9, wherein the at least one point absorber is operatively arranged to displace the line in the first circumferential direction to displace fluid.

11. The assembly as recited in claim 1, wherein the at least one pawl comprises:
 a first pawl operatively arranged to:
  engage the line as the reciprocating element is displaced in the first direction; and
  disengage the line as the reciprocating element is displaced in the second direction, opposite the first direction; and
 a second pawl operatively arranged to:
  disengage the line as the reciprocating element is displaced in the first direction; and
  engage the line as the reciprocating element is displaced in the second direction.

12. The assembly as recited in claim 1, further comprising a cistern, wherein the at least one pump assembly displaces water from a first body of water to the cistern.

13. A wave energy capture, storage, and conversion assembly, comprising:
 a point absorber, including:
  a float;
  a first wheel connected to the float, wherein displacement of the float in a first direction and a second direction displaces the first wheel in a first circumferential direction;
  a reciprocating element pivotably connected to the float; and
  a line engaged with the reciprocating element and the wheel;
 at least one pump assembly non-rotatably connected to the first wheel; and
 at cistern, wherein the at least one pump assembly displaces fluid from a first body of fluid to the cistern.

14. The assembly as recited in claim 13, wherein when the at least one pump assembly is displaced in the first circumferential direction, the at least one pump assembly displaces fluid from a first altitude to a second altitude, the second altitude being greater than the first altitude.

15. The assembly as recited in claim 13, wherein the at least one pump assembly comprises a screw pump assembly, including:
 a screw non-rotatably connected to the first wheel; and
 a tube at least partially encircling the screw.

16. The assembly as recited in claim 13, wherein the at least one pump assembly comprises a pump assembly, including:
 a second wheel non-rotatably connected to the first wheel;
 a third wheel;
 a line non-rotatably connected to the second wheel and the third wheel; and
 a plurality of buckets pivotably connected to the line.

17. A wave energy capture, storage, and conversion assembly, comprising:
 at least one pump assembly;
 a point absorber operatively arranged to displace the at least one pump assembly in a first circumferential direction;
 a float;
 a wheel connected to the float, wherein displacement of the float displaces the wheel in the first circumferential direction;
 an arm pivotably connected to the float, the arm including:
  a first portion operatively arranged to:
   engage the wheel as the arm is displaced in a first direction; and
   disengage the wheel as the arm is displaced in a second direction, opposite the first direction; and
  a second portion operatively arranged to:
   disengage the wheel as the arm is displaced in the first direction; and
   engage the wheel as the arm is displaced in the second direction.

18. The assembly as recited in claim 17, wherein when the at least one pump assembly is displaced in the first circumferential direction, the at least one pump assembly displaces fluid from a first altitude to a second altitude, the second attitude being greater than the first altitude.

19. The assembly as recited in claim 17, wherein the at least one pump assembly comprises a screw pump assembly, including:
 a screw comprising a first end and a second end; and
 a tube at least partially encircling the screw.

20. The assembly as recited in claim 19, wherein the at least one point absorber is operatively arranged to displace the screw in the first circumferential direction to displace fluid.

* * * * *